(12) United States Patent
Luo et al.

(10) Patent No.: US 7,760,659 B2
(45) Date of Patent: Jul. 20, 2010

(54) TRANSMISSION OPTIMIZATION FOR APPLICATION-LEVEL MULTICAST

(75) Inventors: Chong Luo, ShangHai (CN); Jiang Li, Beijing (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1353 days.

(21) Appl. No.: 10/912,488

(22) Filed: Aug. 5, 2004

(65) Prior Publication Data

US 2006/0029092 A1 Feb. 9, 2006

(51) Int. Cl.
*G01R 31/08* (2006.01)

(52) U.S. Cl. .................................. 370/252; 370/260

(58) Field of Classification Search .................. 370/230, 370/235, 252, 260, 261, 390, 401, 432, 465, 370/468
See application file for complete search history.

(56) References Cited

U.S. PATENT DOCUMENTS

| | | | |
|---|---|---|---|
| 5,355,371 A | 10/1994 | Auerbach et al. | |
| 5,867,653 A | 2/1999 | Aras et al. | |
| 5,905,871 A * | 5/1999 | Buskens et al. | 709/245 |
| 6,404,766 B1 * | 6/2002 | Kitai et al. | 370/392 |
| 6,584,071 B1 | 6/2003 | Kodialam et al. | |
| 6,618,752 B1 | 9/2003 | Moore et al. | |
| 6,636,487 B1 * | 10/2003 | Roy | 370/260 |
| 6,842,430 B1 * | 1/2005 | Melnik | 370/254 |
| 7,194,549 B1 * | 3/2007 | Lee et al. | 709/238 |
| 7,355,975 B2 * | 4/2008 | Liu et al. | 370/235 |
| 7,359,939 B2 * | 4/2008 | Poulsen et al. | 709/204 |
| 2002/0150099 A1 * | 10/2002 | Pung et al. | 370/390 |
| 2003/0169685 A1 | 9/2003 | Luss et al. | |
| 2004/0073690 A1 * | 4/2004 | Hepworth et al. | 709/230 |
| 2005/0201278 A1 * | 9/2005 | Banerjee et al. | 370/229 |
| 2007/0005804 A1 * | 1/2007 | Rideout | 709/246 |

OTHER PUBLICATIONS

"High-assurance video conference system over the internet", Arai et al., IEICE Transactions on Communications, vol. E86-B, No. 10, Oct. 2003, pp. 2940-2948.

"Design of a Multi-sender 3D Videoconferencing Application over an End System Multicast Protocol", Hosseini et al., Proceeding of the 11th International Conference on Multimedia, Nov. 2003, pp. 480-489.

(Continued)

*Primary Examiner*—Ricky Ngo
*Assistant Examiner*—Christine Ng
(74) *Attorney, Agent, or Firm*—Lee & Hayes, PLLC

(57) ABSTRACT

Transmission optimization for application-level multicast is described. For each member of a video conference, a multicast tree is generated that represents a data communication configuration of a data source and the other members of a video conference which are data recipients that receive video and audio data from the data source. An end-to-end transmission delay from each data source to each of the respective data recipients is determined, and the available bandwidth between each data source and the respective data recipients is determined. One or more of the multicast trees, each corresponding to a data source, are refined according to the end-to-end transmission delay and available bandwidth for a particular data source to optimize the data communication configuration of the data source in the video conference.

36 Claims, 10 Drawing Sheets

OTHER PUBLICATIONS

"A Case for End System Multicast", Chu et al., Proceedings of the 2000 ACM SIGMETRICS International Conference on Measurement, Jun. 2000, pp. 1-12.

"Enabling Conferencing Applications on the Internet using an Overlay Multicast Architecture", Chu et al., ACM SIGCOMM, Aug. 2001, pp. 55-67.

"Independent-Tree Ad hoc Multicast Routing (ITAMAR)", Sajama et al., Mobile Networks and Applications, vol. 8, No. 5, 2003, pp. 551-566.

"On designing end-user multicast for multiple video sources", Nakamura et al., Proceedings of the 2003 International Conference on Multimedia and Expo, 2003, pp. III-497 to III-500.

"ALMI: An Application Level Multicast Infrastructure", Pendarakis et al., 3rd USENIX Symposium on Internet Technologies and Systems, Mar. 2001, pp. 49-60.

"Priority-Based Distribution Trees for Application-Level Multicast", Vogel et al., Proceedings of the 2nd Workshop on Network and System Support for Games, 2003, pp. 148-157.

Zhu Q et al. "A Source-based algorithm for delay-constrained minimum-cost multicasting" Proc. of Infocom '95-conference on computer communications. 14th Annual Joint Conference of the IEEE comp and Commun Societies, Boston Apr. 2-6, 1995, Los Alamitos, IEEE Comp. Soc. Press, US vol. 3 Conf. 14, pp. 377-385.

Kompella V P et al: "Multicast routing for multmedia communication" IEEE / ACM Transactions on Networking, IEEE Inc. New York, US, vol. 1, No. 3, Jun. 1993,pp. 286-292, XP002253380 ISSN: 1063-6692 col. 1-p. 287.

Ron Widyono: "The design and evaluation of routing algorithms for real-time channels" University of California at Berkeley, Jun. 1994, XP002133060, Sections 1.0, 2.1, 2.4, 3.1-3.3, 4.1-4.5, 4.6.5.

Shuju Wu et al: "Active delay and loss adaptation in overlay muticast tree" Communications, 2004 IEEE International Conference on Paris, france Jun. 20-24, 2004, Piscataway, NJ, USA, IEEE, vol. 4, Jun. 20, 2004, pp. 2014-2018, ISBN: 0-7803-8533-0, XP019652.

Waxman, Ed: Inst of Electrical and Electronics Engineers "Performance evaluation of multipoint routing algorithms" Networking: Found. for the Future. San Fran, Mar. 28-Apr. 1, 1993, Proc of the Ann Joint conf of the C & C societies (Infocom) Los Alamitos, IEEE Comp. Soc. Press, vol. 2 Conf 12 Mar. 28, 1993, pp. 980-986.

* cited by examiner

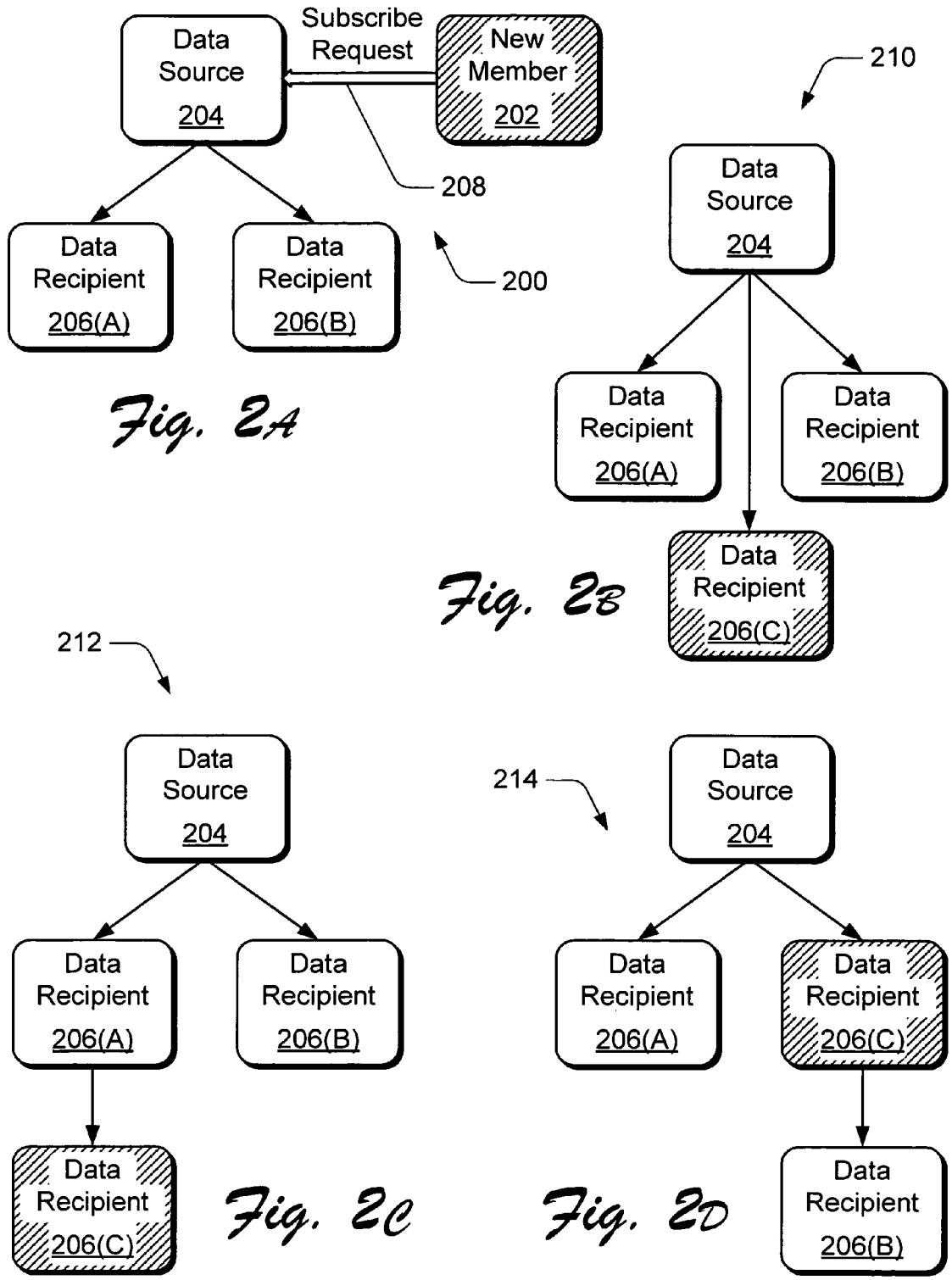

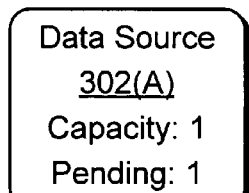
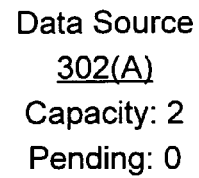
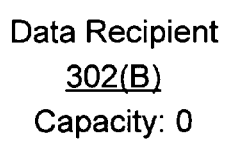
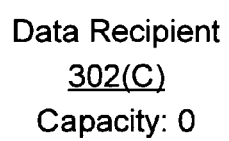
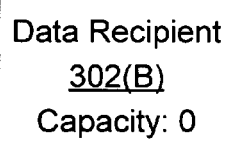
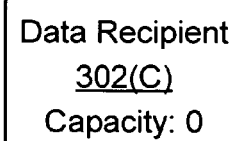
Fig. 3A
Fig. 3B
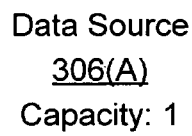
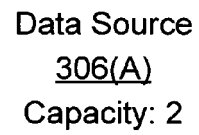
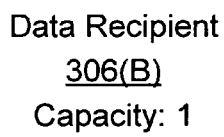
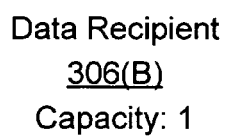
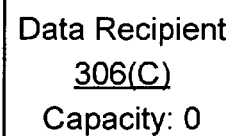
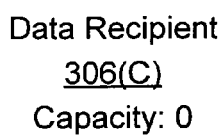
Fig. 3C
Fig. 3D

TRANSMISSION OPTIMIZATION FOR APPLICATION-LEVEL MULTICAST

TECHNICAL FIELD

This invention relates to data communication for multi-party video conferencing and, in particular, to transmission optimization for application-level multicast.

BACKGROUND

The Internet has become an essential part of our daily life and is increasingly utilized as an electronic form of communication via emails, instant messenger services, and similar text-based communication technologies. Additionally, there are increasing demands for real-time, multi-party voice and video conferencing, such as for long-distance education courses, telemedicine, other global business needs, and similar multicast video conferencing applications.

In contrast to a one-to-many content distribution system, small-scale video conferencing applications are implemented with a few-to-few semantic which typically includes ten or fewer participants. Membership in these video conferences can change suddenly where any member may join or leave the video conference, or a member may invite others to conference at any time. Each participant in a multicast video conference is a data source of video and audio data, and each participant is a data recipient of the video and audio data from the other participants.

Each participant in a video conference generates at least video and audio media streams, both of which are highly bandwidth intensive. However, most Internet users have a limited bandwidth connection by which to communicate and receive the video and audio data. Additionally, participants of a video conference may have diverse Internet connections, such as dial-up, DSL, cable modem, and LAN connections. There is an on-going need to optimally serve all of the participants of a real-time, multicast video conference, particularly when many of the participants have different bandwidth capabilities and varying end-to-end communication latencies.

SUMMARY

Transmission optimization for application-level multicast is described herein.

In an implementation, a multicast tree is generated for each member of a video conference. A multicast tree represents a data communication configuration of a data source and other members of a video conference which are data recipients that receive video and audio data from the data source. An end-to-end transmission delay between any two members of the video conference is determined, and the available bandwidth between any two members of the video conference is determined. One or more of the multicast trees, each corresponding to a data source, are refined according to the end-to-end transmission delay and available bandwidth for a particular data source to optimize the data communication configuration of the data source in the video conference.

BRIEF DESCRIPTION OF THE DRAWINGS

The same numbers are used throughout the drawings to reference like features and components.

FIGS. 2A-2D illustrate multicast tree configurations for a multicast session of a data source in the exemplary video conferencing system shown in FIG. 1.

FIGS. 3A-3D illustrate examples of regular multicast tree refinement for video conference members in an implementation of transmission optimization for application-level multicast.

DETAILED DESCRIPTION

Transmission optimization for application-level multicast is a distributed protocol in which the members of a video conference are logically equal and each member controls its own multicast session during the video conference. A multicast session associated with a particular data source which is a member of a video conference is represented by a multicast tree, and each data source maintains a complete member list and controls its own multicast tree. A multicast tree is source-specific and represents a data communication configuration of the video conference members to the particular data source.

Transmission optimization for application-level multicast provides for real-time, multi-party video conferencing, particularly for impromptu video conferencing with a few members. The end-to-end transmission delay from a data source (i.e., video conference member) to each of the other video conference members can be determined, as well as the available bandwidth between the data source and the other video conference members. Each multicast tree for a respective data source can then be refined according to the end-to-end transmission delay and available bandwidth corresponding to each video conference member.

While aspects of the described systems and methods for transmission optimization for application-level multicast can be implemented in any number of different computing systems, environments, and/or configurations, embodiments of transmission optimization for application-level multicast are described in the context of the following exemplary system architecture.

Figure 1:
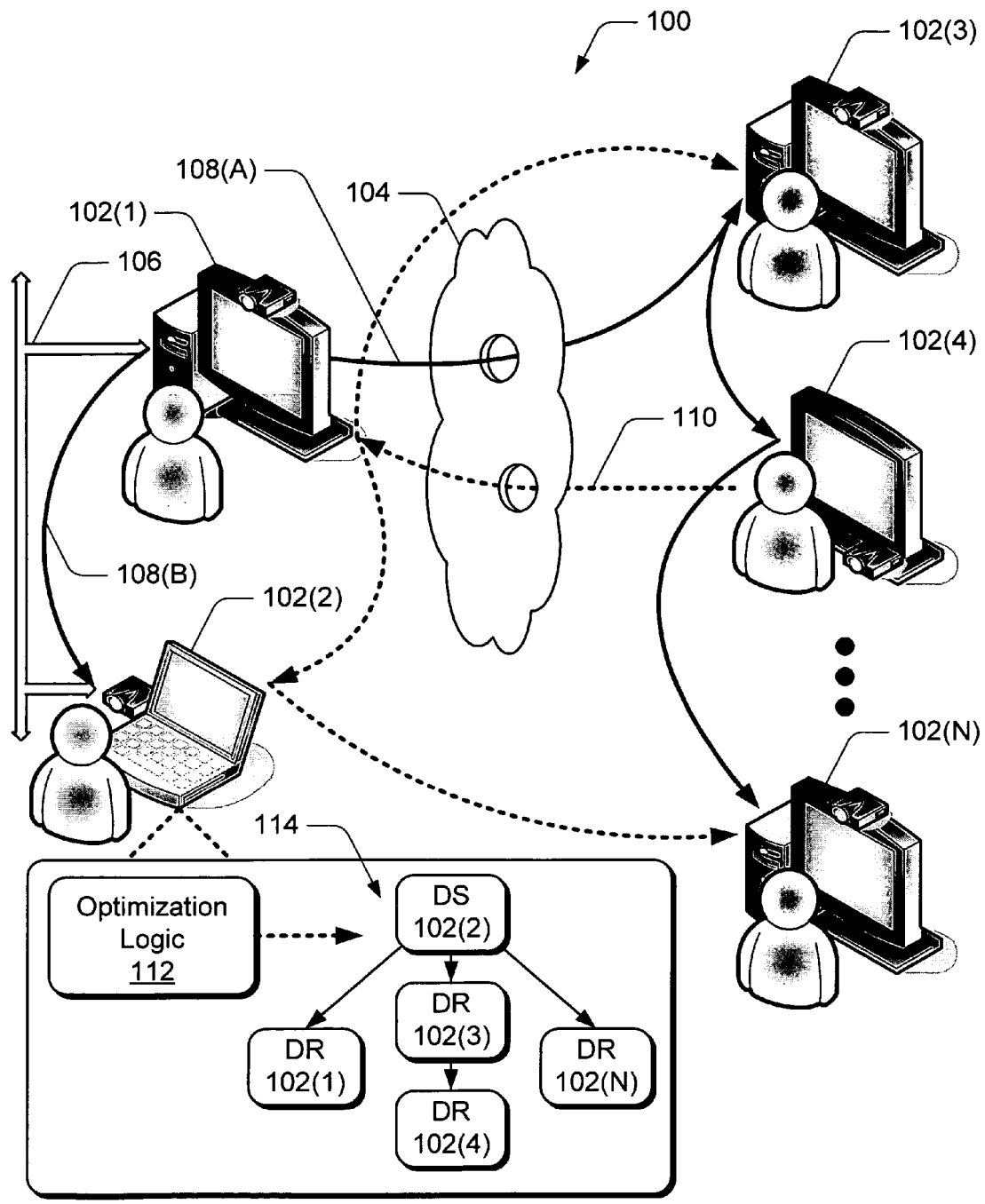
FIG. 1 illustrates various components of an exemplary video conferencing system in which embodiments of transmission optimization for application-level multicast can be implemented.

FIG. 1 illustrates an exemplary video conferencing system 100 that includes multiple data sources 102(1-N) which are each implemented to communicate video conference data as members of a video conference. Each data source 102 multicasts the video conference data, such as video and audio data for the video conference, to all of the other data sources 102 via a communication network 104 and/or via a local network 106 (e.g., data source 102(1) and 102(2) are "local" to each other).

Each data source 102(1-N) generates video conference data for communication to the other data sources and, conversely, each data source 102(1-N) is a data recipient of video conference data from all or most of the other data sources. Accordingly, each data source 102(1-N) is also referred to herein as a respective data recipient 102(1-N). For example, data source 102(1) communicates video conference data 108(A) to data recipients 102(3-N) via communication network 104, and communicates the video conference data 108(B) to data recipient 102(2) via local network 106. Similarly, data source 102(4) communicates video conference data 110 to all of the other data recipients 102(1-3, . . . N). Although not shown, each data source 102(2-3, and N) is a video conference member that also communicates video conference data to all of the other respective data recipients.

The communication network 104 communicatively couples each data source 102(1-N) to each other and can be implemented as any data communication medium, Internet protocol (IP) connection, or communication system having any protocol and/or messaging format. For example, the communication network 104 can be implemented as a local area network (LAN), a wide area network (WAN), a public network such as the Internet, and/or any combination thereof. Although not shown, communication between devices in the video conferencing system 100 can also be facilitated via a cable network, radio frequency signal, over-air broadcast, satellite transmission, and the like. Transmission optimization for application-level multicast can accommodate varied data bit rates, such as 28.8 Kbps, 56 Kbps, and 128 Kbps, to communicate video conference data between the data sources 102(1-N) of a video conference.

Each data source 102(1-N) may be implemented as any form of computing, electronic, and/or video conferencing system with any number and combination of differing components as described below with reference to the computing device 802 shown in FIG. 8. For example, each data source 102(1-N) includes optimization logic 112 that implements embodiments of transmission optimization for application-level multicast (only one example for data source 102(2) is shown).

The optimization logic 112 for a data source 102 generates a source-specific multicast tree 114 that includes the data source as a root node and represents the data communication configuration of the other video conference members (i.e., data recipients) to the data source. As described below with reference to FIGS. 2-6, a multicast tree can include the data recipients as child nodes to the root node (i.e., the data source), and a multicast tree can be configured with multiple layers of nodes. For example, in multicast tree 114, data source 102(2) can communicate video and audio data to data recipient 102(4) via data recipient 102(3).

The optimization logic 112 for data source 102(2) can determine an end-to-end transmission delay from the data source 102(2) to each of the data recipients, and can determine the end-to-end transmission delay between any two members of the video conference. Additionally, the optimization logic 112 can determine the available bandwidth between the data source 102(2) and each of the data recipients, and can determine the available bandwidth between any two members of the video conference. For example, data source 102(4) communicates video conference data 110 to data recipient 102(1) and to data recipient 102(3) via data recipient 102(1). The network dynamics (e.g., the end-to-end transmission delay and the available bandwidth) between data source 102(4) and data recipient 102(1), between data source 102(4) and data recipient 102(3), and between data recipient 102(1) and data recipient 102(3) can be determined.

The optimization logic of a particular data source 102 can then refine the respective multicast tree for the data source 102 based on the end-to-end transmission delay and the available bandwidth corresponding to each data recipient to optimize the data communication configuration for the data source 102. Each data source 102(1-N) of the video conferencing system 100 implements a version of the optimization logic 112 to optimize the data communication configuration for each respective data source which also optimizes the overall performance of video conference data communication for the video conference.

FIGS. 2A-2D illustrate configuration options for a multicast session which is represented as a multicast tree 200 when a new member 202 submits a request to join a video conference and receive video conference data from a particular data source 204. A multicast session pertains to a particular data source in a video conference and is represented by a multicast tree. A multicast tree is initially constructed by a local greedy algorithm and then improved as described in embodiments of transmission optimization for application-level multicast. The multicast trees are both constructed and refined based on end-to-end transmission delays and available bandwidth measurements between a data source and the respective data recipients.

FIG. 2A illustrates multicast tree 200 which includes the data source 204 as a root node and represents the data communication configuration of data recipients 206(A) and 206(B) to data source 204 from the perspective of data source 204. The data source 204 communicates video conference data, such as video and audio data, to data recipients 206(A) and 206(B) during a video conference. For example, data source 204 may represent data source 102(1) in the video conferencing system 100 shown in FIG. 1, and data recipients 206(A) and 206(B) may represent data recipients 102(2) and 102(3), respectively. Similar to the multicast tree 200 which represents the multicast session from the perspective of data source 204, each of the data recipients 206(A) and 206(B) can be represented by a multicast tree that illustrates a data communication configuration when a data recipient transmits its own video and audio data.

New member 202 submits a subscribe request 208 to data source 204 to join the video conference as a data recipient of video conference data from data source 204. The data source 204 adds the new member 202 to the multicast tree 200 when the subscribe request 208 is received. The new member 202 can be added to receive the video conference data from data source 204 according to one of the multicast tree configurations shown in FIGS. 2B-2D.

FIG. 2B illustrates multicast tree 210 for the multicast session associated with data source 204 if the new member 202 is added as data recipient 206(C) with a direct communication link to data source 204. A new member will be communicatively linked to the root node (e.g., data source 204) of the multicast tree 210 if data source 204 has enough available bandwidth to support the direct connection. In an event that the new member 202 cannot be added to multicast tree 210 with a direct communication link to data source 204 as shown in FIG. 2B, the new member 202 can be added to multicast tree 212 as shown in FIG. 2C, or can be added to multicast tree 214 as shown in FIG. 2D.

FIG. 2C illustrates multicast tree 212 for the multicast session associated with data source 204 if the new member 202 is added as data recipient 206(C) via a communication link through an established data recipient without altering existing communication links. For example, the new member 202 is added as data recipient 206(C) via a communication link through data recipient 206(A). The existing communication links from data source 204 to data recipients 206(A) and 206(B) remain unchanged in this representation of the multicast session.

FIG. 2D illustrates multicast tree 214 for the multicast session associated with data source 204 if the new member 202 is added as data recipient 206(C) and if existing communication link(s) are reconfigured. For example, the new member 202 is added as data recipient 206(C) and replaces data recipient 206(B) with a direct communication link to data source 204. Data recipient 206(B) is then configured via a communication link through data recipient 206(C).

As described above, a multicast tree is constructed based on end-to-end transmission delays and bandwidth measurements between a data source and the respective data recipients. The new member 202 can be added as data recipient 206(C) to the multicast tree configuration 210, 212, or 214 that provides the least transmission latency to transmit the video conference data from the data source 204 to the farthest data recipient, such as the new data recipient 206(C) in configuration 212 or data recipient 206(B) in configuration 214. Additionally, an optimization cost can be determined or associated for each multicast tree configuration 210, 212, or 214 when adding a new member.

For example, multicast tree 210 (FIG. 2B) is preferable over multicast tree 212 (FIG. 2C) because the end-to-end transmission delay from the data source 204 to the new data recipient 206(C) will be a shorter time duration (i.e., because the data source 204 communicates the video conference data directly to data recipient 206(C)). However, the configuration of multicast tree 212 can be selected if an optimization cost does not exceed an implementation specific threshold. Further, multicast tree 212 (FIG. 2C) is preferable over multicast tree 214 (FIG. 2D) for system stability because the existing communication links to data recipients 206(A) and 206(B) are not altered in multicast tree 212.

If none of the video conference members in multicast tree 200 have available bandwidth to add new member 202 when the new member submits the subscribe request 208 to join the video conference, the subscribe request 208 can be queued in a wait list until the bandwidth and/or a configuration option becomes available. Additionally, the data source 204 can differentiate between video data and audio data streams to join a new member that receives just audio data until more bandwidth becomes available. While video enhances video conference participation, the audio is a necessity for participant communication when video conferencing. The data source 204 can differentiate between the video data and the audio data by constructing separate multicast trees for the different video data and audio data streams. Further, the data source 204 can alter an existing communication link with a data recipient to provide additional bandwidth and accommodate the subscribe request 208 from new member 202.

Initially, the multicast tree construction for each data source in a video conference may result in unbalanced bandwidth usage between the video conference members. Further, each multicast session may change suddenly, as does the network dynamics, while video conference members subscribe to join a video conference and unsubscribe to disconnect from the video conference. Accordingly, the multicast trees of corresponding data sources are refined based on the end-to-end transmission delays and the available bandwidth to optimize performance and to avoid introducing perceptible jitters into the video conference.

Various techniques to refine the multicast trees include regular multicast tree refinement described below with reference to FIGS. 3A-3D, intra-multicast tree refinement described below with reference to FIGS. 4A and 4B, and inter-multicast tree refinement described below with reference to FIGS. 5A and 5B, and FIGS. 6A and 6B.

FIGS. 3A-3D illustrate examples of regular multicast tree refinement for video conference members in an implementation of transmission optimization for application-level multicast. In FIG. 3A, a multicast tree 300 represents a multicast session associated with a video conference member identified as data source 302(A) which communicates video conference data to a data recipient 302(B). In this example, data source 302(A) has bandwidth capacity to communicate video and audio data to only the one data recipient 302(B). A new video conference member, data recipient 302(C), has submitted a subscribe request to data source 302(A) which maintains the data recipient 302(C) as pending. FIG. 3B illustrates a regular refinement of multicast tree 300 when the bandwidth capacity of data source 302(A) increases such that data source 302(A) can communicate the video and audio data to both data recipients 302(B) and 302(C).

FIG. 3C illustrates another example of a multicast tree 304 that represents a multicast session associated with a video conference member identified as data source 306(A) which communicates video conference data to a data recipient 306(B). In this example, data source 302(A) has bandwidth capacity to communicate video and audio data to only the one data recipient 306(B). However, data source 306(A) can communicate the video and audio data to a second data recipient 306(C) via a communication link through the first data recipient 306(B) which also has bandwidth capacity to communicate the video and audio data to one data recipient.

In this example, there is an end-to-end transmission delay, or latency, of 500 ms (milliseconds) to communicate the video conference data from data source 306(A) to data recipient 306(B). Additionally, there is an end-to-end transmission delay of 500 ms to communicate the video conference data from data recipient 306(B) to data recipient 306(C). The overall delay from data source 306(A) to data recipient 306(C) is 1000 ms (i.e., one second), and the multicast tree 304 for data source 306(A) can be refined to improve the 1000 ms end-to-end transmission delay.

FIG. 3D illustrates a regular refinement of multicast tree 304 when the bandwidth capacity of data source 306(A) increases such that data source 306(A) can directly communicate the video conference data to both data recipients 306(B) and 306(C). Additionally, video conference members 306(A) and 306(C) are local to the same communication network (e.g., within the same domain) such that the end-to-end transmission delay between data source 306(A) and data recipient 306(C) is only 20 ms. Thus, the overall transmission delay for data source 306(A) has been reduced 500 ms (i.e., from 1000 ms to 500 ms). The end-to-end transmission delay times of 20 ms and 500 ms are merely exemplary and approximate, and are described in the many examples herein to illustrate the various multicast tree refinements and video conference communication improvements.

Although not shown, an alternate refinement of multicast tree 304 would be to reorganize the data distribution configuration such that data source 306(A) communicates the video conference data to data recipient 306(C) which in turn communicates the video conference data to data recipient 306(B). Because data source 306(A) and data recipient 306(C) are within the same domain, the end-to-end transmission delay from data source 306(A) to data recipient 306(C) is 20 ms. The end-to-end transmission delay from data recipient 306(C) to 306(B) is still 500 ms, however the overall transmission delay for data source 306(A) would be reduced 480 ms (i.e., from 1000 ms to 520 ms). This is an example of intra-multicast tree refinement described further with reference to FIGS.

4A and 4B. For an intra-multicast tree refinement, the existing communication links are reconfigured as would be the case if data recipients 306(B) and 306(C) were switched in a refinement of multicast tree 304.

The end-to-end transmission delay and the available bandwidth between conference members is not static during a video conference. Accordingly, these two metrics are periodically measured during a video conference to optimize the video conference data communications. Each data source can determine the available bandwidth of the communication connections to the other video conference members with a packet-pair method to measure the available bandwidth. Each data source can also probe the other video conference members to determine the end-to-end transmission delay between a data source and the other video conference members.

In one embodiment, a data source can generate a probing message every five seconds to determine the end-to-end transmission delay between the data source and another video conference member. A probing message can also serve to detect communication failures with the other video conference members. If a video conference member does not respond to a probing message within an implementation specific designated time duration, the data source can determine that the video conference member has had a network communication failure.

Figure 4A:
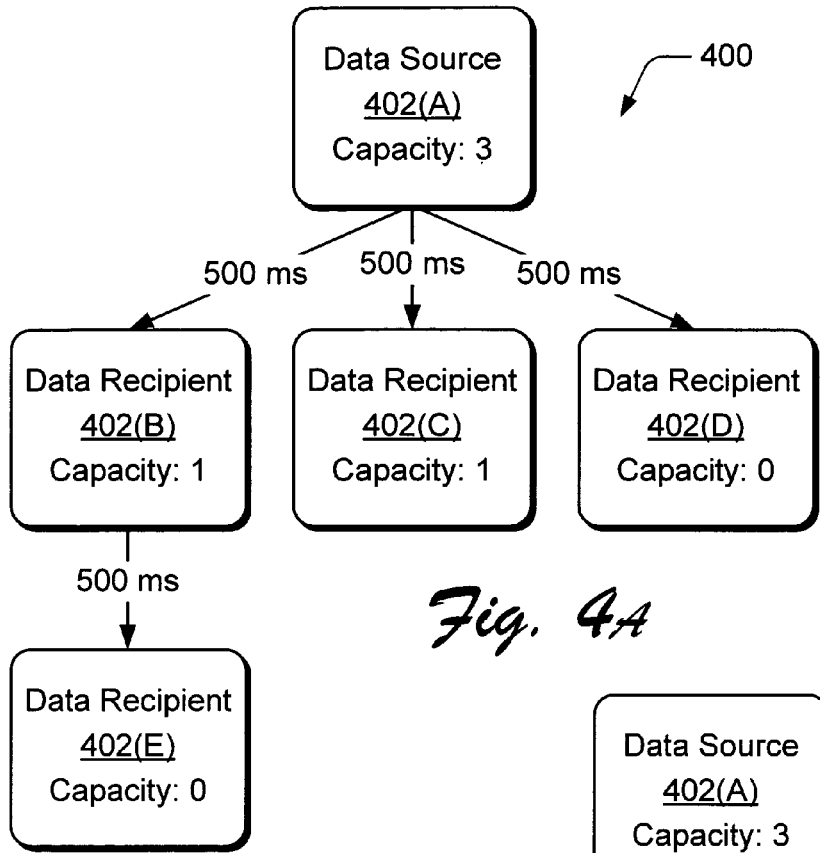
FIGS. 4A and 4B illustrate an example of intra-multicast tree refinement for video conference members in an implementation of transmission optimization for application-level multicast.
Figure 4B:
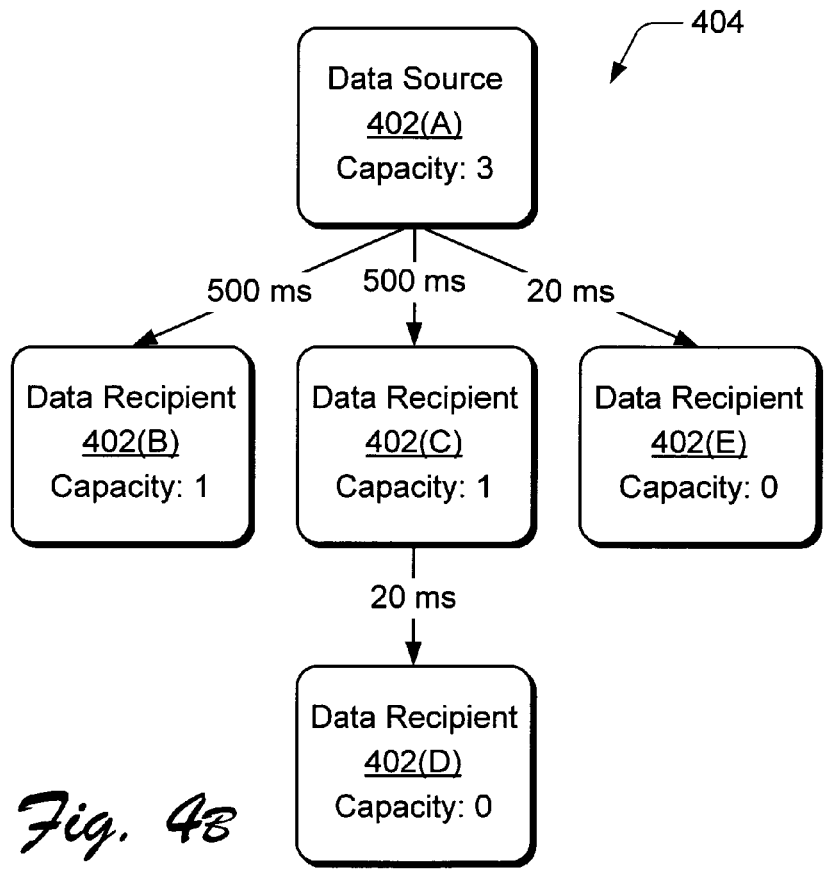

FIGS. 4A and 4B illustrate an example of intra-multicast tree refinement for video conference members in an implementation of transmission optimization for application-level multicast. In FIG. 4A, a multicast tree 400 represents a multicast session associated with a video conference member identified as data source 402(A) which communicates video conference data to several data recipients. In this example, data source 402(A) has bandwidth capacity to communicate video and audio data to three data recipients 402(B), 402(C), and 402(D). Additionally, data recipients 402(B) and 402(C) each have bandwidth capacity to communicate the video and audio data to an additional data recipient. A data recipient 402(E) receives the video and audio data from data source 402(A) via a communication link through data recipient 402(B) which has the bandwidth capacity to support the one data recipient 402(E).

In this example, there is an end-to-end transmission delay of 500 ms to communicate the video conference data from data source 402(A) to each of the data recipients 402(B), 402(C), and 402(D). Additionally, there is an end-to-end transmission delay of 500 ms to communicate the video conference data from data recipient 402(B) to data recipient 402(E).

Suppose that data source 402(A) and data recipient 402(E) are connected within a same domain such that the end-to-end transmission delay between the two video conference members is only 20 ms. Similarly, suppose that data recipients 402(B), 402(C), and 402(D) are connected within a local communication network and the end-to-end transmission delay between any of the three video conference members is only 20 ms.

FIG. 4B illustrates an intra-tree refinement of multicast tree 400 (FIG. 4A) to generate a refined multicast tree 404 (FIG. 4B) which takes advantage of the shorter end-to-end transmission delays (e.g., 20 ms is a shorter delay than 500 ms). In this example, data recipient 402(E) replaces data recipient 402(D) with a direct communication link from data source 402(A). Data recipient 402(D) is then configured to receive the video and audio data from data source 402(A) via a communication link through data recipient 402(C).

In the refined multicast tree 404, the end-to-end transmission delay between data source 402(A) and 402(E) is only 20 ms. Additionally, the end-to-end transmission delay between data recipient 402(C) and 402(D) is only 20 ms, and the overall end-to-end transmission delay from data source 402(A) to the data recipient 402(D) is 520 ms. Thus, the overall transmission delay for multicast tree 404 has been reduced 480 ms (i.e., from 1000 ms A-B-E in multicast tree 400 to 520 ms A-C-D in multicast tree 404).

Although not shown, an alternate refinement of multicast tree 404 can include data recipient 402(D) configured to receive the video conference data from data source 402(A) via a communication link through data recipient 402(B). Because data recipients 402(B) and 402(D) are connected within a local communication network as described above, the overall transmission delay for the multicast tree 404 would still be 520 ms (i.e., 520 ms A-B-D in multicast tree 404). In practice, data recipient 402(D) can be configured to receive the video conference data via a communication link through data recipient 402(B) or 402(C) depending on which end-to-end transmission delay is actually determined to provide the optimal communication performance.

Intra-multicast tree refinement as shown in FIGS. 4A and 4B differs from the regular refinement shown in FIGS. 3A-3D in that intra-multicast tree refinement reconfigures the data recipients and existing communication links to shorten the end-to-end transmission delays. For example, data recipient 402(E) replaces data recipient 402(D) in multicast tree 404 and the existing communication links are altered to achieve better video conference performance.

Figure 5A:
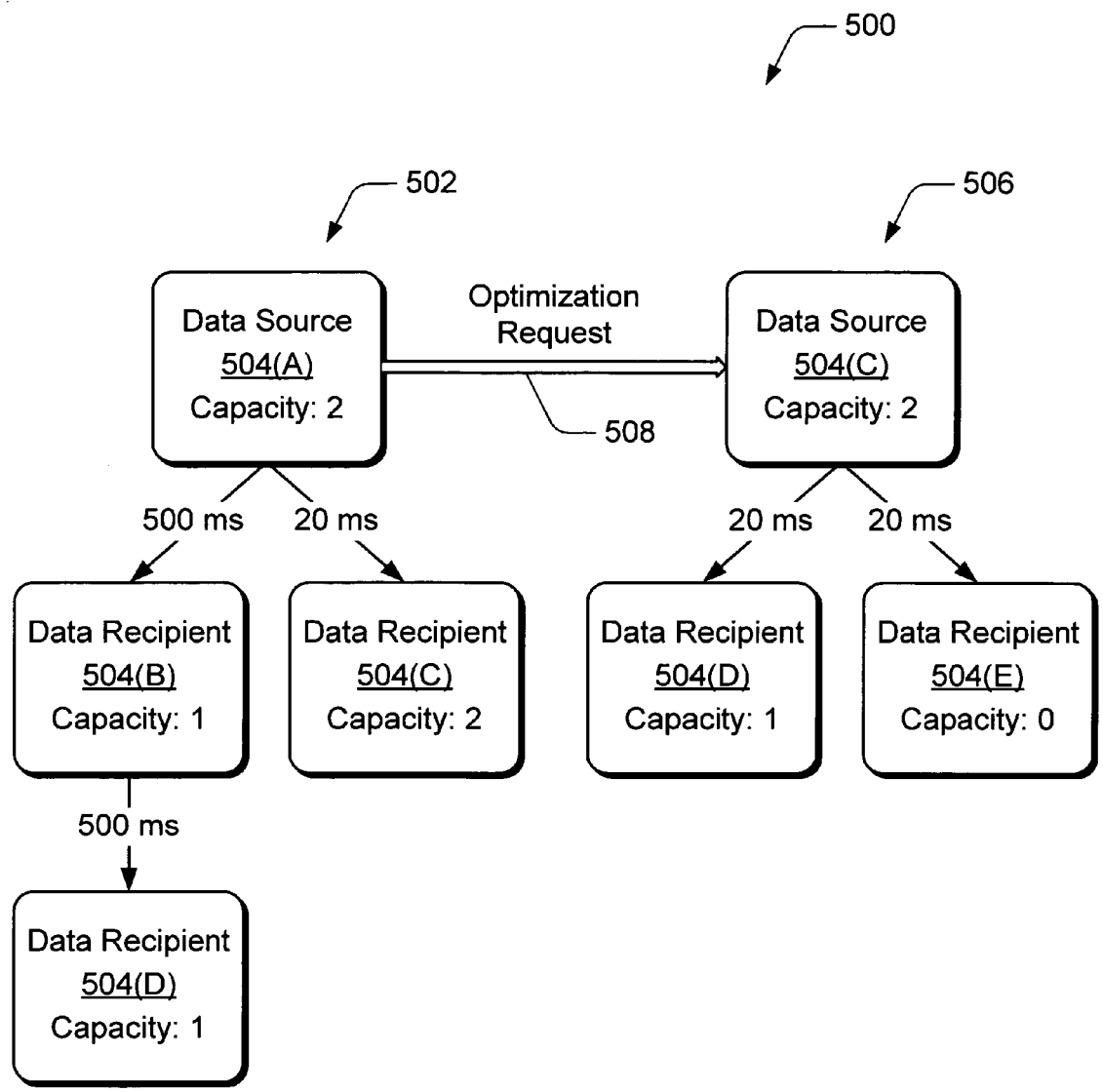
FIGS. 5A and 5B illustrate an example of inter-multicast tree refinement for video conference members in an implementation of transmission optimization for application-level multicast.
Figure 5B:
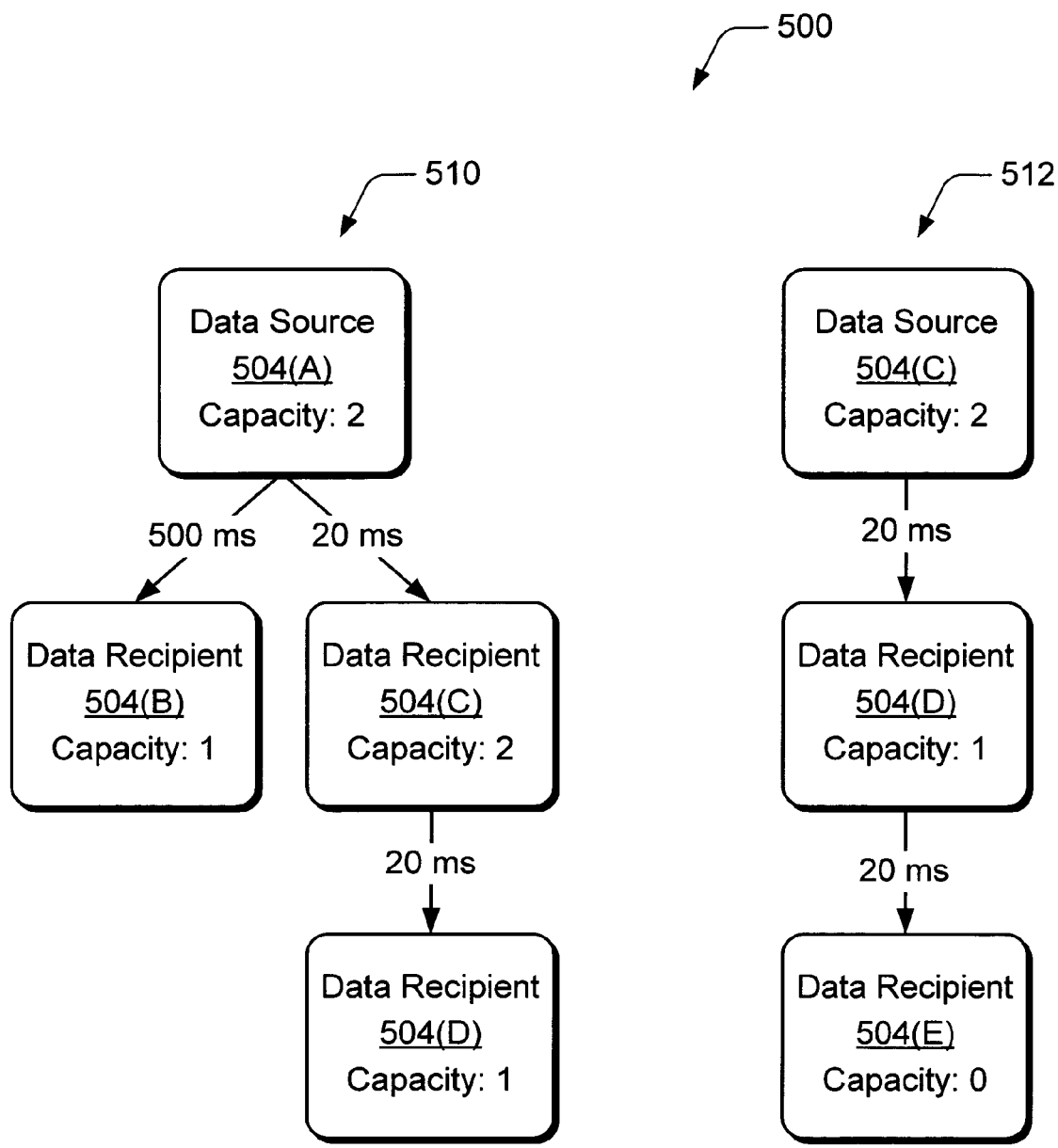

FIGS. 5A and 5B illustrate an example of inter-multicast tree refinement for video conference members in an implementation of transmission optimization for application-level multicast. In FIG. 5A, a video conference 500 includes a multicast tree 502 that represents a multicast session from the perspective of a video conference member identified as data source 504(A) which communicates video conference data to several data recipients. The video conference 500 also includes a multicast tree 506 that represents a multicast session from the perspective of a video conference member identified as data source 504(C) which also communicates video conference data to data recipients.

In this example, data source 504(A) has bandwidth capacity to communicate video and audio data to two data recipients 504(B) and 504(C) in multicast tree 502. Additionally, data recipient 504(B) has bandwidth capacity to communicate the video and audio data from data source 504(A) to an additional data recipient 504(D). Data source 504(C) in multicast tree 506 has bandwidth capacity to communicate video conference data to two data recipients 504(D) and 504(E). As described above, a data source may also be referred to as a data recipient and, in this example, data source 504(C) in multicast tree 506 is also data recipient 504(C) in multicast tree 502.

In this example, data source 504(A) and data recipients 504(C), 504(D), and 504(E) are connected within a same network domain such that an end-to-end transmission delay between any of the video conference members is only 20 ms. Data recipient 504(B) is connected to the video conference via a different network such that an end-to-end transmission delay between data recipient 504(B) and the other video conference members is 500 ms. As such, there is a 1000 ms delay from data source 504(A) to data recipient 504(D) via the communication link through data recipient 504(B).

To enhance the performance of video conference 500 and to minimize the overall transmission delay of 1000 ms in multicast tree 502, data source 504(A) submits an optimization request 508 to data source 504(C) of multicast tree 506. In response to the optimization request 508, data source 504

(C) can reconfigure the multicast tree 506 so that data source 504(A) can reconfigure multicast tree 502.

FIG. 5B illustrates an inter-multicast tree refinement of multicast tree 502 to generate a refined multicast tree 510, and an inter-multicast tree refinement of multicast tree 506 to generate a refined multicast tree 512 in video conference 500. In refined multicast tree 512, data recipient 504(E) receives the video and audio data from data source 504(C) via a communication link through data recipient 504(D). In refined multicast tree 510, data recipient 504(D) receives video and audio data from data source 504(A) via a communication link through data recipient 504(C). Although the overall end-to-end transmission delay of multicast tree 512 has been increased by 20 ms to 40 ms, multicast tree 510 has been improved by 500 ms (i.e., from 1000 ms A-B-D to 500 ms A-B).

Figure 6A:
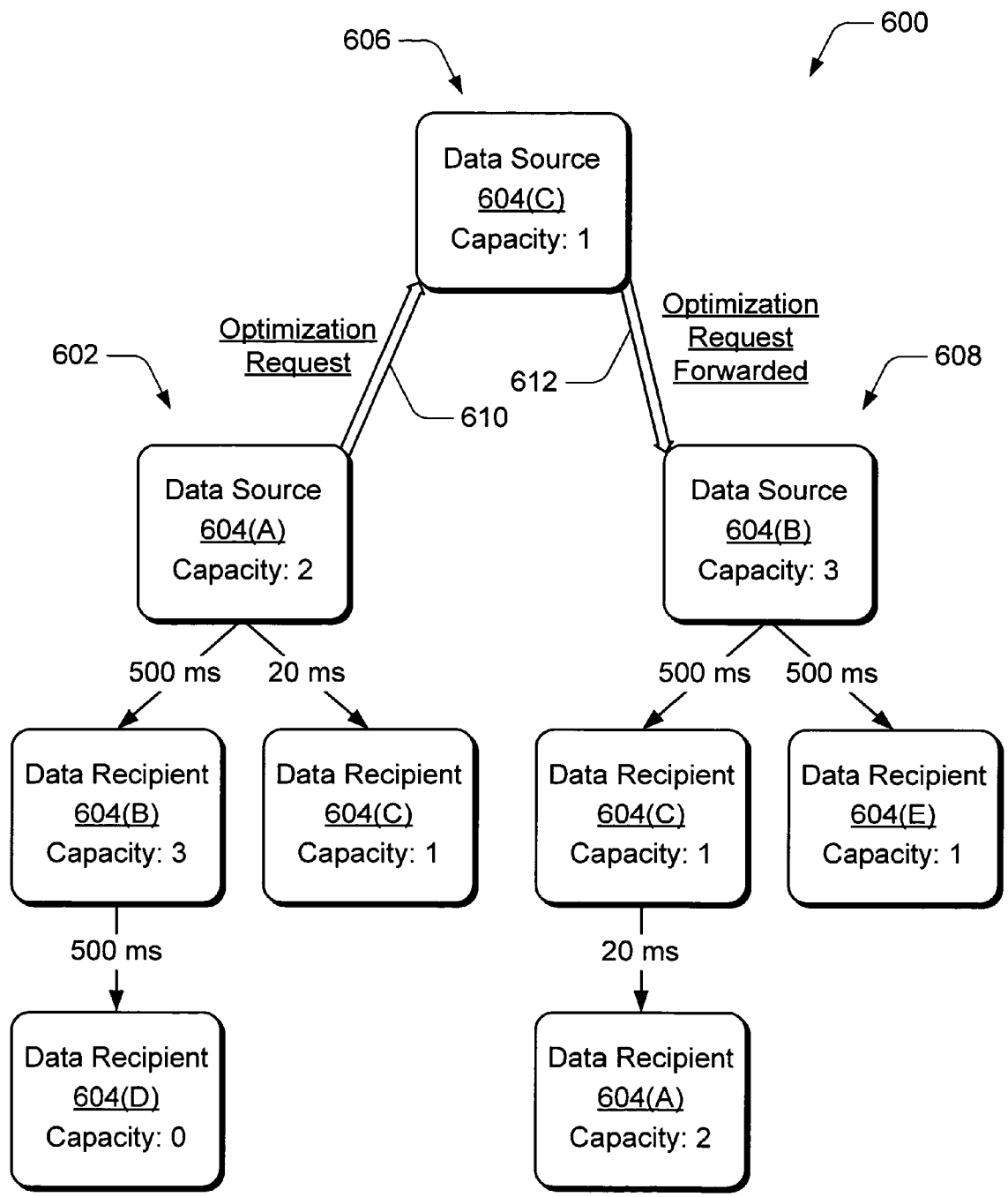
FIGS. 6A and 6B illustrate another example of inter-multicast tree refinement for video conference members in an implementation of transmission optimization for application-level multicast.
Figure 6B:
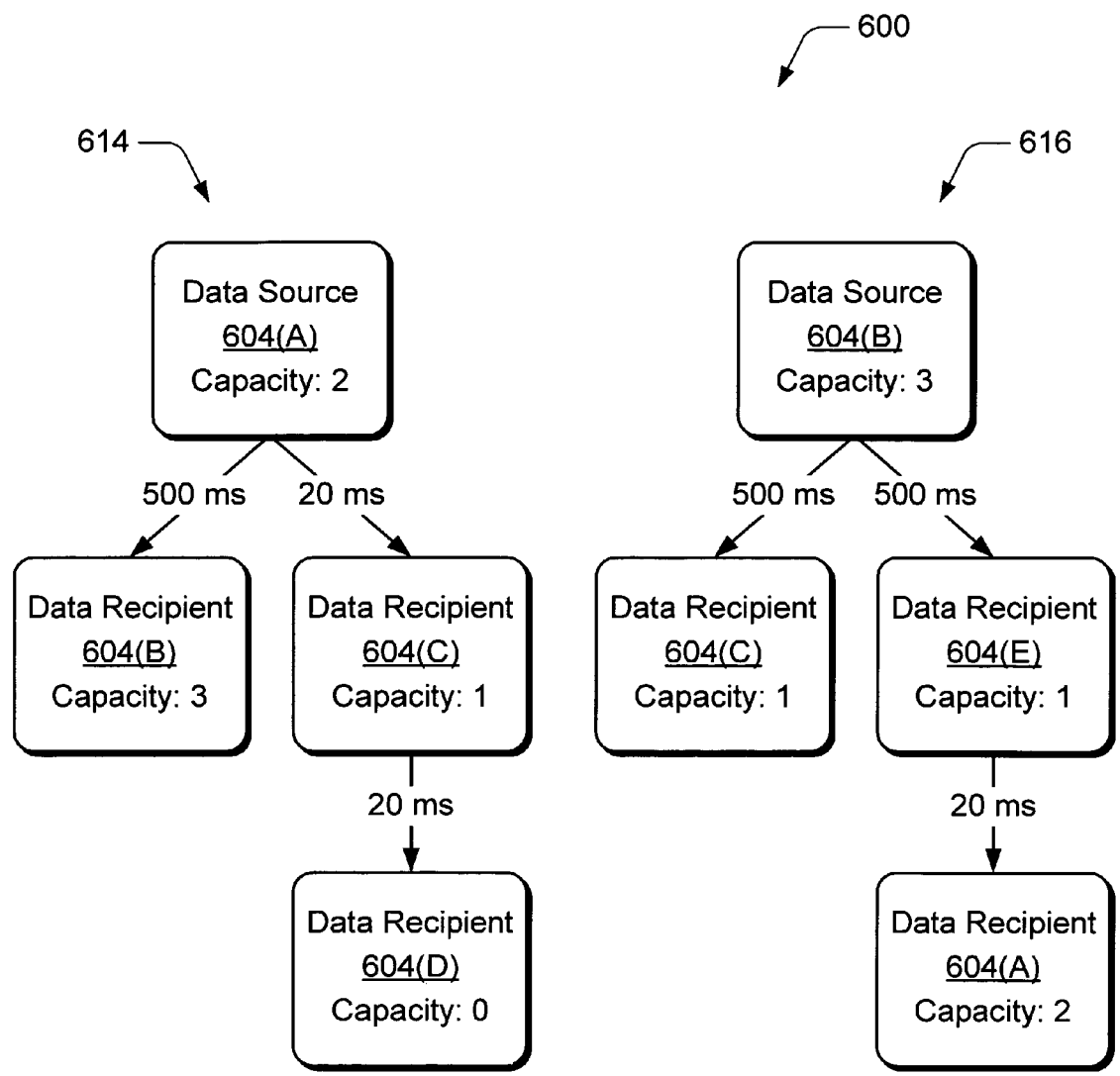

FIGS. 6A and 6B illustrate another example of inter-multicast tree refinement for video conference members in an implementation of transmission optimization for application-level multicast. In FIG. 6A, a video conference 600 includes a multicast tree 602 that represents a multicast session from the perspective of a video conference member identified as data source 604(A) which communicates video conference data to several data recipients. The video conference 600 also includes a multicast tree 606 that represents a multicast session from the perspective of data source 604(C), and includes a multicast tree 608 that represents a multicast session from the perspective of data source 604(B) which also communicates video and audio data to data recipients.

In this example, data source 604(A) has bandwidth capacity to communicate video and audio data to two data recipients 604(B) and 604(C). Additionally, data recipient 604(B) has bandwidth capacity to communicate the video and audio data from data source 604(A) to an additional data recipient 604(D). Data source 604(B) has bandwidth capacity to communicate video and audio data to data recipients 604(C) and 604(E). Additionally, data recipient 604(C) has bandwidth capacity to communicate the video and audio data from data source 604(B) to an additional data recipient 604(A). As described above, a data source may also be referred to as a data recipient and, in this example, data source 604(A) in multicast tree 602 is also data recipient 604(A) in multicast tree 608. Additionally, data source 604(C) in multicast tree 606 is also data recipient 604(C) in both multicast trees 602 and 608.

In this example, the video conference members 604(A), 604(C), 604(D), and 604(E) are connected within a same network domain such that an end-to-end transmission delay between any of the video conference members is only 20 ms. Data recipient 604(B) is connected to the video conference 600 via a different network such that an end-to-end transmission delay between data recipient 604(B) and the other video conference members is 500 ms. As such, there is a 1000 ms delay from data source 604(A) to data recipient 604(D) via the communication link through data recipient 604(B).

To enhance the performance of video conference 600 and to minimize the overall transmission delay of 1000 ms in multicast tree 602, data source 604(A) submits an optimization request 610 to data source 604(C) of multicast tree 606. In response to the optimization request 610, the multicast tree 606 can not be reconfigured and data source 604(C) forwards the optimization request 612 to data source 604(B). In response to the forwarded optimization request 612, the multicast tree 608 is reconfigured so that multicast tree 602 can be reconfigured.

FIG. 6B illustrates an inter-multicast tree refinement of multicast tree 602 to generate a refined multicast tree 614, and an inter-multicast tree refinement of multicast tree 608 to generate a refined multicast tree 616 in video conference 600. In refined multicast tree 616, data recipient 604(A) receives video and audio data from data source 604(B) via a communication link through data recipient 604(E). In refined multicast tree 614, data recipient 604(D) receives video and audio data from data source 604(A) via a communication link through data recipient 604(C). Although the overall end-to-end transmission delay of 520 ms for multicast tree 616 has not changed, multicast tree 614 has been improved by 500 ms (i.e., from 1000 ms A-B-D to 500 ms A-B).

Methods for transmission optimization for application-level multicast, such as exemplary method 700 described with reference to FIG. 7, may be described in the general context of computer executable instructions. Generally, computer executable instructions include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 7:
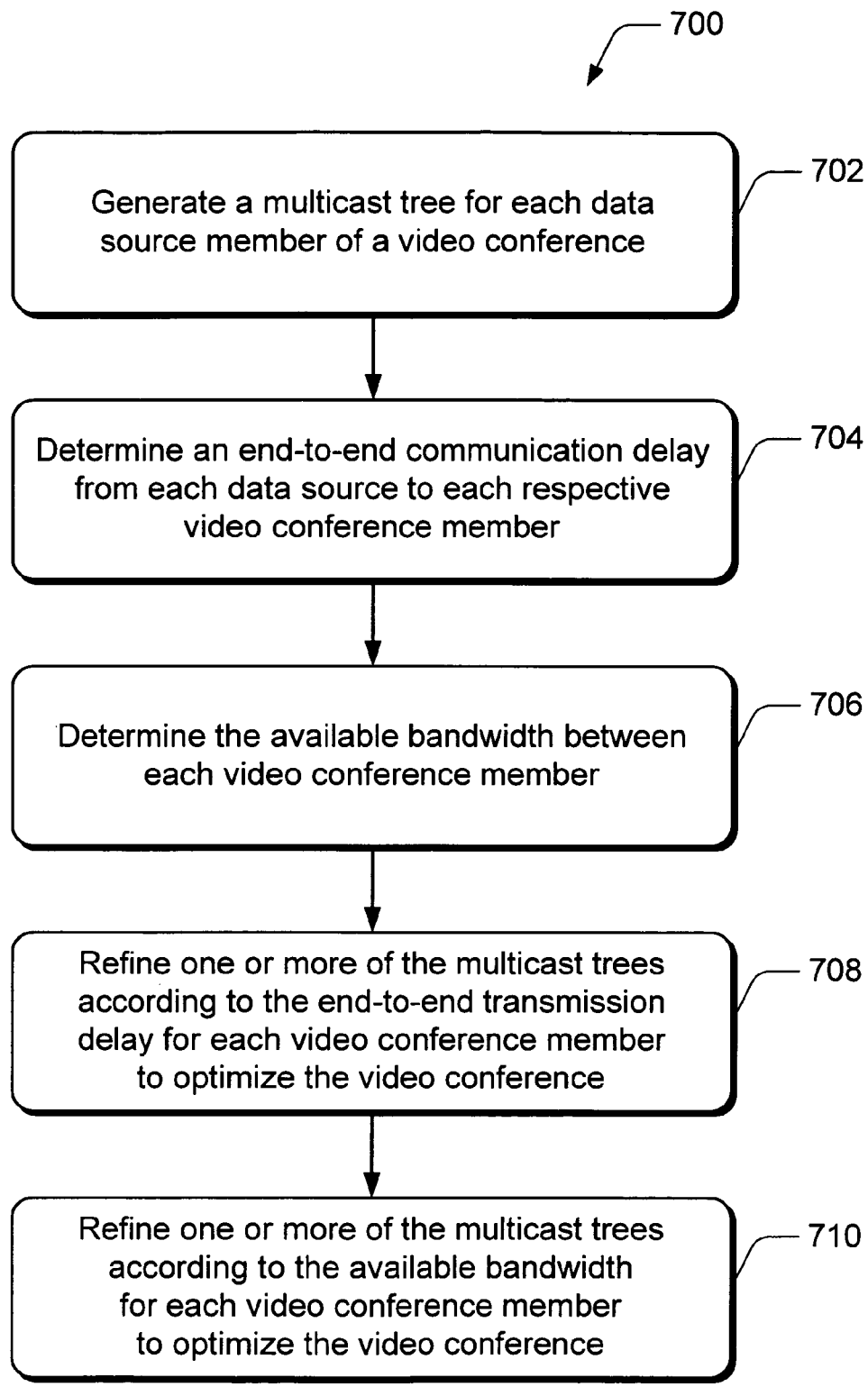
FIG. 7 is a flow diagram that illustrates an exemplary method for an embodiment of transmission optimization for application-level multicast.

FIG. 7 illustrates an exemplary method 700 for transmission optimization for application-level multicast. The order in which the method is described is not intended to be construed as a limitation, and any number of the described method blocks can be combined in any order to implement the method. Furthermore, the method can be implemented in any suitable hardware, software, firmware, or combination thereof.

At block 702, a multicast tree is generated for each data source member of a video conference. A multicast tree for a data source represents a data communication configuration of the data source and the video conference members that receive video and audio data from the data source during a video conference. For example, optimization logic 112 (FIG. 1) generates multicast tree 114 to include the data source 102(2) as a root node of the multicast tree 114 and the data recipients 102(1), 102(3), 102(4), and 102(N) as child nodes in the multicast tree 114.

At block 704, an end-to-end transmission delay is determined from each data source to each of the respective video conference members. For example, optimization logic 112 of a data source 102 can generate a probing message every five seconds to determine the end-to-end transmission delay between the data source and another video conference member that receives video and audio data from the data source. At block 706, the available bandwidth between each data source and each of the respective video conference members is determined. For example, optimization logic 112 of a data source 102 can determine the available bandwidth of a communication connection to another video conference member with a packet-pair method to measure the available bandwidth between the data source and the respective data recipients of the video conference data.

At block 708, one or more of the multicast trees corresponding to the members of the video conference are refined according to the end-to-end transmission delay determined for each data source and the respective video conference members. At block 710, one or more of the multicast trees corresponding to the members of the video conference are refined according to the available bandwidth determined for each data source and the respective video conference members.

For example, optimization logic 112 of a particular data source refines an associated multicast tree to optimize the data communication configuration of the data source in a video conference. Refining a multicast tree can include reconfiguring a communication link by which a child node that represents a video conference member in the multicast tree receives the video and audio data. Further, one or more of the multicast trees can be refined to optimize audio data communication for the video conference. Refining the multicast trees may also include a first data source initiating an optimization request to a second data source to refine a corresponding multicast tree and make additional bandwidth available such that the first data source can refine an associated multicast tree.

Figure 8:
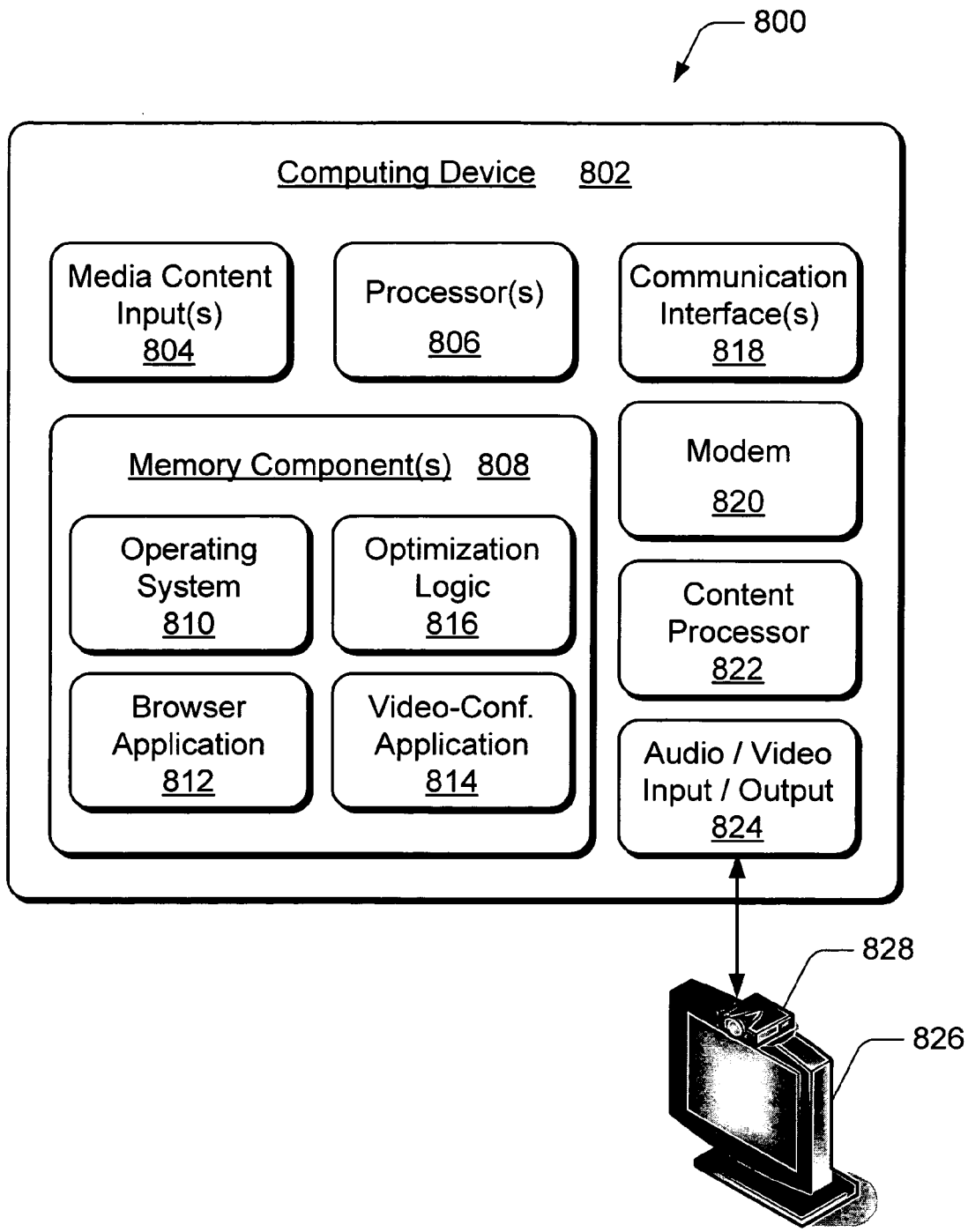
FIG. 8 illustrates various components of an exemplary computing device that can be implemented as any one of multiple data sources and/or data recipients in the exemplary video conferencing system shown in FIG. 1.

FIG. 8 illustrates various components of an exemplary computing system 800 that can be implemented as any one of the multiple data sources 102(1-N) in the video conferencing system 100 shown in FIG. 1. The computing system 800 includes a computing device 802 which can be implemented in any number of embodiments with numerous other general purpose or special purpose computing system environments or configurations. Examples of well known computing systems, environments, and/or configurations that may be implemented in the exemplary computing system 800 include, but are not limited to, personal computers, server computers, hand-held or laptop devices, multiprocessor systems, microprocessor-based systems, set-top boxes, programmable consumer electronics, network PCs, a digital video recorder (DVR) and playback system, gaming consoles, distributed computing environments that include any of the above systems or devices, and the like.

The computing device 802 includes one or more media content inputs 804 which may include Internet Protocol (IP) inputs over which streams of media content are received via an IP-based network (e.g., communication network 104 shown in FIG. 1). The media content inputs 804 may also include tuners that can be tuned to various frequencies or channels to receive television signals when computing device 802 is embodied as a set-top box or as a digital video recorder, for example. The computing device 802 also includes one or more processors 806 (e.g., any of microprocessors, controllers, and the like) which process various instructions to control the operation of computing device 802 and to communicate with other electronic and computing devices.

The computing device 802 can be implemented with one or more memory components 808, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like. The memory components 808 provide data storage mechanisms to store various information and/or data such as received media content, software applications, and any other types of information and data related to operational aspects of computing device 802.

An operating system 810, a browser application 812, and a video conference application 814 can all be maintained as software applications with non-volatile memory components 808 and executed on processor(s) 806. The browser application 812 provides a user interface through which a user can interact with and browse the Web (e.g., World Wide Web) via the Internet. The video conference application 814 facilitates video and audio conference communication and provides a user interface through which a video conference member can interact with a data source 102 in the video conferencing system 100 shown in FIG. 1.

In this example, optimization logic 816 is also maintained with non-volatile memory components 808 as a software application that can be executed on processor(s) 806 to implement embodiments of transmission optimization for application-level multicast. Optimization logic 816 is an example of optimization logic 112 shown in FIG. 1 for data source 102 (2). As described above, the optimization logic 816 (e.g., optimization logic 112) for a particular data source generates a source-specific multicast tree for the data source in a video conference, and determines network dynamics (e.g., end-to-end transmission delays and the available bandwidth) between any two video conference members. The optimization logic 816 of the particular data source can then refine the respective multicast tree for the data source based on the end-to-end transmission delay and the available bandwidth corresponding to each data recipient of the video conference data to optimize the data communication configuration for the data source.

Although the optimization logic 816 is illustrated and described as a single application, the optimization logic 816 can be implemented as several component applications distributed to each perform one or more functions in the exemplary computing system 800. Further, the optimization logic 816 may be implemented on a device other than the computing device 802, where the other device may also be configured for communication with computing device 802 in the computing system 800.

As used herein, the term "logic" (e.g., the optimization logic 816) can also refer to hardware, firmware, software, or any combination thereof that may be implemented to perform the logical operations associated with the embodiments of anonymous aliases. Logic may also include any supporting circuitry utilized to complete a given task including supportive non-logical operations. For example, logic may also include analog circuitry, memory components, input/output (I/O) circuitry, interface circuitry, power providing/regulating circuitry, and the like.

The computing device 802 further includes communication interface(s) 818 and a modem 820. The communication interface(s) 818 can be implemented as any one or more of a serial and/or parallel interface, a wireless interface, any type of network interface, and as any other type of communication interface. A wireless interface enables computing device 802 to receive control input commands and other information from an input device, such as from a remote control device or from another infrared (IR), 802.11, Bluetooth, or similar RF input device.

A network interface provides a connection between computing device 802 and the communication network 104 by which the other electronic and computing devices (e.g., each data source 102(1-N)) coupled to communication network 104 communicates setup information, and audio and video data to computing device 802. Similarly, a serial and/or parallel interface provides a data communication path directly between computing device 802 and the other electronic or computing devices. Modem 820 facilitates computing device 802 communication with the other electronic and computing devices via a conventional telephone line, a DSL connection, cable, and/or other type of connection. Although not shown, computing device 802 may also include user and other input devices such as a keyboard, mouse, pointing device, and/or other mechanisms to interact with, and to input information to computing device 802.

Computing device 802 also includes a content processor 822 which can include a video decoder and/or additional processors to receive, process, and decode media content and display data. Computing device 802 also includes an audio and/or video input/output 824 that provides audio and video to an audio rendering and/or display device 826, or to other devices that process, display, and/or otherwise render audio, video, and display data. The audio and/or video input/output 824 also receives audio and video inputs from a camera device 828 to facilitate video conferencing. Video signals and audio signals can be communicated from computing device 802 to display device 826, and to computing device 802 from the camera device 828, via an RF (radio frequency) link, S-video link, composite video link, component video link, analog audio connection, or other similar communication links.

Although shown separately, some of the components of computing device 802 may be implemented in an application specific integrated circuit (ASIC). Additionally, a system bus (not shown) typically connects the various components within computing device 802. A system bus can be implemented as one or more of any of several types of bus structures, including a memory bus or memory controller, a peripheral bus, an accelerated graphics port, or a local bus using any of a variety of bus architectures.

Although embodiments of transmission optimization for application-level multicast have been described in language specific to structural features and/or methods, it is to be understood that the subject of the appended claims is not necessarily limited to the specific features or methods described. Rather, the specific features and methods are disclosed as exemplary implementations of transmission optimization for application-level multicast.

The invention claimed is:

1. A distributed optimization system for multicast data, comprising:
   a memory:
   a processor coupled to the memory;
   a data source on the memory configured as one of multiple video conference members in a multicast video conference, wherein each member in the multicast video conference is a data source communicating video conference data to other video conference members via a communication network, the data source maintaining a complete member list;
   a multicast tree generated by a local greedy algorithm, wherein the multicast tree is controlled and maintained by the data source;
   the multicast tree configured to add a new video conference data recipient by determining a least transmission latency to transmit video and audio data from the data source to the new video conference data recipient, wherein when bandwidth is unavailable for the new video conference data recipient, a request to add the new video conference data recipient is queued until the bandwidth becomes available; and
   an optimization logic generated for each data source in the multicast video conference, configured to:
      determine an end-to-end transmission delay from the data source to each of the video conference members;
      determine available bandwidth between the data source and each of the video conference members; and
      optimize a data communication configuration for the data source according to the end-to-end transmission delay and the available bandwidth corresponding to each video conference member, wherein an optimization step comprises refining data communication configuration of the data source in the multicast video conference;
      wherein, based on the end-to-end transmission delay and the available bandwidth, the refining comprises an intra-tree refinement, wherein a node of the multicast tree is re-arranged to a new parent node within the multicast tree and children of the new parent node are re-arranged in response.

2. A distributed optimization system as recited in claim 1, wherein the optimization logic is further configured to:
   determine an end-to-end transmission delay between each of the video conference members; and
   determine available bandwidth between each of the video conference members.

3. A distributed optimization system as recited in claim 1, wherein the multicast tree further comprises the data source as a root node and represents the data communication configuration of the video conference members to the data source.

4. A distributed optimization system as recited in claim 1, wherein the optimization logic resides at the data source.

5. A distributed optimization system as recited in claim 1, wherein the multicast tree further comprises the data communication configuration of the video conference members to the data source, and wherein the optimization logic is further configured to refine the multicast tree to optimize the data communication configuration for the data source.

6. A distributed optimization system as recited in claim 1, wherein the multicast tree further comprises the data source as a root node and represents the data communication configuration of the video conference members to the data source, and wherein the optimization logic is further configured to refine the multicast tree to optimize audio data communication for the data source.

7. A distributed optimization system as recited in claim 1, wherein the multicast tree further comprises the data source as a root node and represents the data communication configuration of the video conference members to the data source, and wherein the optimization logic is further configured to generate the multicast tree as each of the video conference members subscribe to receive the video conference data from the data source.

8. A distributed optimization system as recited in claim 1, wherein the multicast tree further comprises the data source as a root node and represents the data communication configuration of the video conference members to the data source, and wherein the optimization logic is further configured to: generate the multicast tree as each of the video conference members subscribe to receive the video conference data from the data source; and refine the multicast tree to optimize the data communication configuration for the data source.

9. A distributed optimization system as recited in claim 1, wherein the multicast tree further comprises the data source as a root node and represents the data communication configuration of the video conference members to the data source, and wherein the optimization logic is further configured to reconfigure a communication link by which a node that represents a video conference member in the multicast tree receives the video conference data.

10. A video conference data source, comprising:
   a video conference member of multiple video conference members in a multicast video conference, wherein each video conference member is a video conference data source and a video conference data recipient in the multicast video conference;

a multicast tree, maintained and controlled by the video conference data source, that includes the video conference data source as a root node and that represents a data communication configuration with video conference members in a video conference, the video conference members each configured to receive video and audio data from the video conference data source; and an optimization logic configured to:
generate a source-specific multicast tree by a local greedy algorithm for the video conference data source;
determine an end-to-end transmission delay from the video conference data source to each of the video conference members; and
refine the multicast tree according to the end-to-end transmission delay corresponding to each of the video conference members to optimize the data communication configuration for the video conference data source;
wherein the optimization logic is further configured to initiate an optimization request to a video conference member to refine a corresponding multicast tree and make additional bandwidth available to enable refining of the multicast tree, and
wherein refining comprises an inter-tree refinement, wherein a node of the source-specific multicast tree is re-arranged using another multicast tree of another video conference data source.

11. A video conference data source as recited in claim 10, wherein the optimization logic is further configured to:
determine the available bandwidth between the video conference data source and each of the video conference members; and
refine the multicast tree according to the available bandwidth corresponding to each of the video conference members to further optimize the data communication configuration for the video conference data source.

12. A video conference data source as recited in claim 10, wherein the optimization logic is further configured to refine the multicast tree to optimize audio data communication for the video conference data source.

13. A video conference data source as recited in claim 10, wherein the optimization logic is further configured to generate the multicast tree as each of the video conference members subscribe to receive the video and audio data from the video conference data source.

14. A video conference data source as recited in claim 10, wherein the optimization logic is further configured to reconfigure a communication link by which a node that represents a video conference member in the multicast tree receives the video and audio data.

15. A video conference data source as recited in claim 10, wherein the optimization logic is further configured to initiate an optimization request to a video conference member to reconfigure a communication link in a corresponding multicast tree such that a communication link in the multicast tree can be reconfigured.

16. A method, comprising:
generating a multicast tree, maintained and controlled by a video conference data source, that represents a data communication configuration of the video conference data source and video conference members that receive video and audio data from the video conference data source during a video conference, wherein each video conference member is the video conference data source and a video conference data recipient in the multicast video conference, wherein the multicast tree is generated using a local greedy algorithm;
adding a new video conference data recipient to the multicast tree by determining a least transmission latency to transmit the video and audio data from the video conference data source to the new video conference data recipient,
queuing a request to add the new video conference data recipient in a queue until bandwidth becomes available, wherein the new video conference data recipient receives audio data from the data source while waiting in the queue until the bandwidth becomes available to convey both the video and audio data from the video conference data source;
determining an end-to-end transmission delay from the data source to each of the video conference members; and
refining the multicast tree according to the end-to-end transmission delay corresponding to each of the video conference members to optimize the data communication configuration of the data source in the video conference.

17. A method as recited in claim 16, further comprising determining end-to-end transmission delays between each of the video conference members.

18. A method as recited in claim 16, further comprising:
determining available bandwidth between the data source and each of the video conference members; and
refining the multicast tree according to the available bandwidth corresponding to each of the video conference members to further optimize the data communication configuration of the data source.

19. A method as recited in claim 16, further comprising determining available bandwidth between each of the video conference members.

20. A method as recited in claim 16, wherein refining the multicast tree includes refining the multicast tree to optimize audio data communication for the data source during the video conference.

21. A method as recited in claim 16, further comprising:
determining available bandwidth between the data source and each of the video conference members; and
refining the multicast tree according to the available bandwidth corresponding to each of the video conference members to optimize audio data communication for the data source during the video conference.

22. A method as recited in claim 16, wherein:
generating the multicast tree includes generating the multicast tree to include the data source as a root node of the multicast tree and the video conference members as nodes of the multicast tree; and
refining the multicast tree includes reconfiguring a communication link by which a node that represents a video conference member in the multicast tree receives the video and audio data.

23. A method as recited in claim 16, further comprising initiating an optimization request to a video conference member to refine a corresponding multicast tree and make additional bandwidth available such that the data source can refine the multicast tree.

24. A method as recited in claim 16, further comprising initiating an optimization request to a video conference member to reconfigure a communication link in a corresponding multicast tree such that the data source can reconfigure a communication link in the multicast tree.

25. One or more computer readable media comprising computer executable instructions that, when executed, direct a video conference member to perform the method as recited in claim 16.

26. One or more computer readable storage media comprising computer executable instructions, the instructions when executed by a processor, direct a video conference data source to:
- generate a multicast tree via a local greedy algorithm, the multicast tree maintained and controlled by the video conference data source in a multicast video conference comprising multiple video conference members, each video conference member being the video conference data source in the multicast video conference, wherein the multicast tree includes the video conference data source as a root node and represents a data communication configuration by which other video conference data sources, or other video conference members, in the multicast video conference receive video and audio data from the video conference data source, the multicast tree configured to add a new video conference member;
- determine an end-to-end transmission delay from the video conference data source to each of the video conference members;
- determine available bandwidth between the video conference data source and each of the video conference members; and
- refine the multicast tree according to the end-to-end transmission delay and the available bandwidth corresponding to each of the video conference members to optimize the data communication configuration of the video conference data source in the video conference;
- wherein, based on the end-to-end transmission delay and the available bandwidth, the refine step comprises an intra-tree refinement that comprises re-arranging a node of the multicast tree to a new parent node within the multicast tree, wherein children of the new parent node are re-arranged in response; wherein each node corresponds to a video conference member,
- wherein when bandwidth is unavailable for the addition of the new video conference member to the multicast tree, a request to add the new video conference member to the multicast tree is queued until bandwidth becomes available.

27. One or more computer readable storage media as recited in claim 26, further comprising computer executable instructions that, when executed, direct the video conference data source to refine the multicast tree to optimize audio data communication for the video conference data source in the video conference.

28. One or more computer readable storage media as recited in claim 26, further comprising computer executable instructions that, when executed, direct the video conference data source to: generate the multicast tree to include the video conference members as nodes of the root node in the multicast tree; and reconfigure a communication link by which a node that represents a video conference member in the multicast tree receives the video and audio data.

29. One or more computer readable storage media as recited in claim 26, further comprising computer executable instructions that, when executed, direct the video conference data source to initiate an optimization request to a video conference member to refine a corresponding multicast tree and make additional bandwidth available such that the video conference data source can refine the multicast tree.

30. One or more computer readable storage media as recited in claim 26, further comprising computer executable instructions that, when executed, direct the video conference data source to initiate an optimization request to a video conference member to reconfigure a communication link in a corresponding multicast tree such that the video conference data source can reconfigure a communication link in the multicast tree.

31. A data source, comprising:
- a processor; and
- processor-readable code executable by the processor to cause the processor to perform:
- communicating video conference data to data recipients configured as members of a video conference, wherein each member of the video conference is a data source;
- receiving additional video conference data from each of the data recipients;
- generating a multicast tree by a local greedy algorithm, maintained and controlled by the data source, that represents a data communication configuration of the data source and other data recipients of the video conference;
- queuing a request to add a new data recipient in a queue until bandwidth becomes available, wherein the new data recipient receives audio data from the data source while waiting in the queue until the bandwidth becomes available to convey both the video and audio data from a data source;
- determining an end-to-end transmission delay from the data source to each of the data recipients; and
- refining the multicast tree according to the end-to-end transmission delay corresponding to each of the data recipients to optimize the data communication configuration of the data source in the video conference, wherein the refining comprises an inter-tree refinement, wherein an inter-tree refinement comprises re-arranging a node of the multicast tree using another multicast tree of another video conference data source.

32. A data source as recited in claim 31, further comprising: determining available bandwidth between the data source and each of the data recipients; and means for refining the multicast tree according to the available bandwidth corresponding to each of the data recipients to further optimize the data communication configuration of the data source.

33. A data source as recited in claim 31, further comprising refining the multicast tree to optimize audio data communication for the data source.

34. A data source as recited in claim 31, further comprising: generating the multicast tree to include the data source as a root node of the multicast tree and the data recipients as nodes of the multicast tree; and reconfiguring a communication link by which a node that represents a data recipient in the multicast tree receives the video conference data.

35. A data source as recited in claim 31, further comprising initiating an optimization request to a data recipient to refine a corresponding multicast tree and make additional bandwidth available such that the data source can refine the multicast tree.

36. A data source as recited in claim 31, further comprising initiating an optimization request to a data recipient to reconfigure a communication link in a corresponding multicast tree such that the data source can reconfigure a communication link in the multicast tree.

* * * * *